United States Patent
Price

(10) Patent No.: US 9,207,039 B1
(45) Date of Patent: Dec. 8, 2015

(54) RAPID-FIRING SPEAR GUN WITH RETAINED PROJECTILE

(71) Applicant: Michael D. Price, Oceanside, CA (US)

(72) Inventor: Michael D. Price, Oceanside, CA (US)

( * ) Notice: Subject to any disclaimer, the term of this patent is extended or adjusted under 35 U.S.C. 154(b) by 0 days.

(21) Appl. No.: 14/723,347

(22) Filed: May 27, 2015

Related U.S. Application Data

(60) Provisional application No. 62/005,442, filed on May 30, 2014.

(51) Int. Cl.
| | |
|---|---|
| *F41B 11/83* | (2013.01) |
| *F41B 11/723* | (2013.01) |
| *F41B 11/68* | (2013.01) |
| *F41C 9/06* | (2006.01) |

(52) U.S. Cl.
CPC ............... *F41B 11/83* (2013.01); *F41B 11/68* (2013.01); *F41B 11/723* (2013.01); *F41C 9/06* (2013.01)

(58) Field of Classification Search
CPC .......... F41B 11/83; F41B 11/68; A01K 81/04
USPC ................. 124/73, 20.3, 26; 42/1.14
See application file for complete search history.

(56) References Cited

U.S. PATENT DOCUMENTS

| | | | | |
|---|---|---|---|---|
| 2,642,056 | A * | 6/1953 | Harris | F41B 11/00 124/73 |
| 2,923,286 | A * | 2/1960 | Draganti | F41B 11/83 124/31 |
| 3,090,151 | A * | 5/1963 | Stewart | F41B 11/83 124/37 |
| 4,660,315 | A * | 4/1987 | Ferro | F41B 11/83 43/6 |
| 5,566,858 | A * | 10/1996 | Ducker, III | A01K 81/06 222/192 |
| 8,087,406 | B2 * | 1/2012 | Axelsson | F41B 11/62 124/71 |

* cited by examiner

*Primary Examiner* — Reginald Tillman, Jr.
(74) *Attorney, Agent, or Firm* — Palomar Patent; Mary Jo Redman; Calif Tervo

(57) ABSTRACT

Spear gun for killing venomous fish is powered by compressed gas such as from SCUBA tank. Spear is attached to a base plate that retains spear partially inside body of spear gun. Discharge of spear gun compresses a spring as spear moves forward, causing spear to automatically return to cocked position after firing. Sliding spear cover makes transport of spear gun safer and helps to dislodge fish from spear.

7 Claims, 3 Drawing Sheets

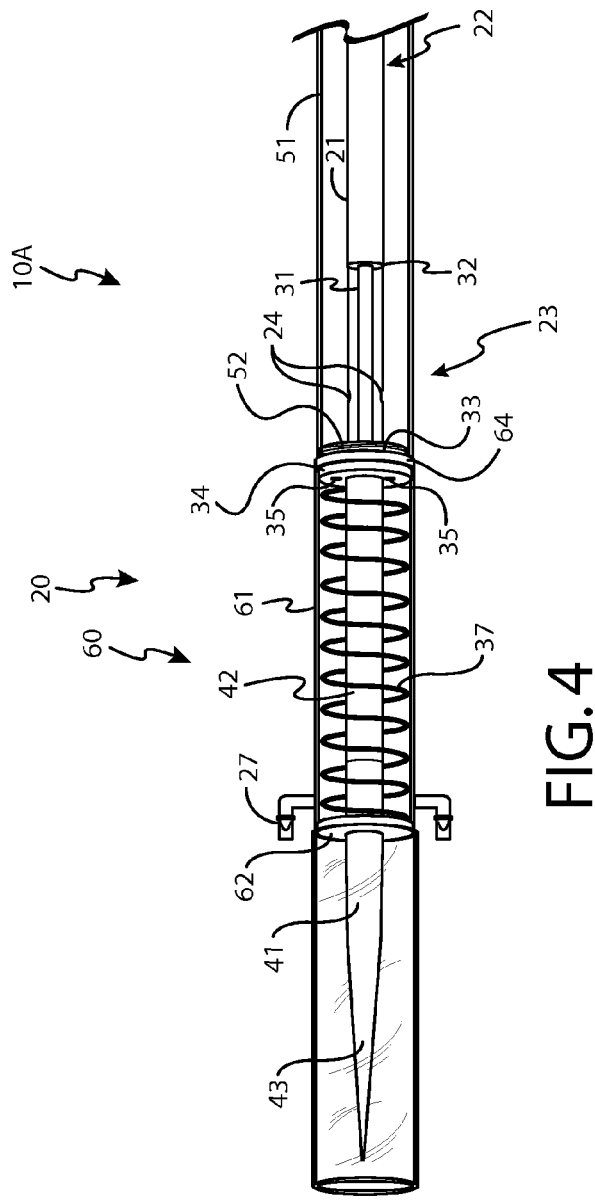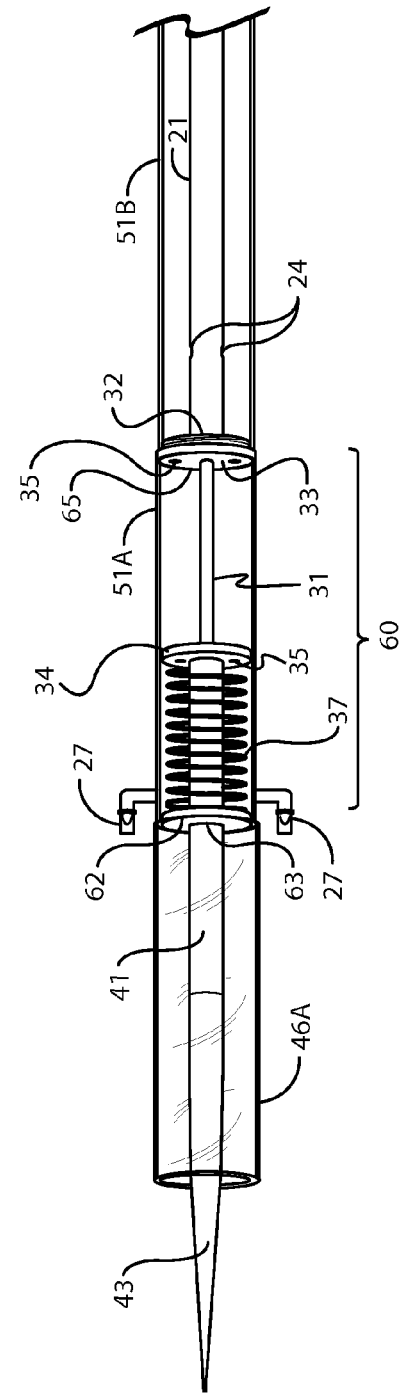

RAPID-FIRING SPEAR GUN WITH RETAINED PROJECTILE

CROSS-REFERENCE TO RELATED APPLICATIONS

This application claims the benefit of U.S. Provisional Application No. 62/005,442, filed May 30, 2014.

FIELD OF THE INVENTION

This invention relates generally to spears for fishing, and more specifically involves a gas-powered spear gun.

BACKGROUND OF THE INVENTION

Lionfish such as *Pterois volitans* and *Pterois miles* are reef-dwelling predatory fish native to the Indo-Pacific region. In their native waters, lionfish have co-evolved with other fish such that their population is relatively stable.

Unfortunately, lionfish have been recently introduced into the Caribbean Sea and western Atlantic Ocean. With plenty of naïve prey and few predators able to kill them, the lionfish population has exploded and their range is expanding quickly. They eat small crustaceans and fish, notably including a critically endangered wrasse and immature snapper and grouper, two economically important Caribbean fish.

In response, fishermen in the Caribbean and along the southeast coast of the United States have begun catching lionfish to sell as human food. Also, divers often simply kill lionfish for sport and to help protect the lionfish prey species. Although a few young lionfish are netted to sell as aquarium specimens, mature lionfish are generally killed with a spear gun because their venomous spines can inflict painful and debilitating injuries on humans.

Lionfish show little fear of divers and can be approached to within a few feet, making them relatively easy to spear. Two obvious challenges related to spearing lionfish for food are getting the fish off the spear safely and minimizing damage to the reef. If a spear passes through a fish or misses it entirely, it is likely to hit the living coral where lionfish lurk. Because much of the motivation of spearing the dangerous-to-handle lionfish at all is to counteract the damage they do to the environment, it is undesirable to hunt them in a way that damages coral.

Two other practical concerns are 1) killing enough lionfish to make a difference in their population and 2) many subsistence fishermen in the Caribbean area cannot afford complex and expensive equipment.

To kill lionfish quickly, they are preferably killed with a single shot from a spear gun and removed quickly from the spear head. Conventionally, fishermen "bag" a lionfish by scraping it on the lip of a rigid container. Actual bags are no longer used much, because many people have been stung by spines protruding through the mesh or when removing the fish from the spear with an implement such as pliers.

Spear guns are typically powered by either a stretchy sling, such as rubber tubing or strips cut from an inner tube, or compressed gas, typically carbon dioxide from a canister attached to the spear gun.

Slings have the advantage of being useful for weeks until the rubber strips or tubing must be replaced, however, they have a slow firing rate because the elastic must be pulled onto a cocking mechanism by hand before each shot. Because a more powerful sling is proportionally harder to cock, a sling that reliably kills a lionfish with one shot from a safe distance is apt to be especially slow to prepare for firing.

Compressed gas, such as carbon dioxide, could provide sufficient pressure and volume for one-shot killing of a lionfish, but the volume of the cylinders is limited. Conventionally, a small "soda siphon" cylinder is attached underneath the forward portion of the spear gun or a larger canister is attached near the back end of the spear gun. The canister must be small enough that it does not make the spear gun difficult to swim with or to aim. Because the only way to determine how much gas remains in one of these canisters is to weigh it, a diver generally must carry spares. When a cylinder is exhausted on a dive, the canister may be discarded on the spot, likely to corrode and disperse metal compounds that are toxic to marine life. The ongoing expense of carbon dioxide canisters is too great for many fishermen.

In demonstrations of killing lionfish with spear guns powered by compressed carbon dioxide, it has been shown that multiple shots are usually required to kill or at least immobilize a lionfish to the point that it can be safely removed from the spear. This is inhumane, as well as slow, and wasteful of compressed gas.

A potential power source for a spear gun is the compressed breathing air used by SCUBA divers and normally carried on the user's back. This power source is not being used, though, because it is believed that using breathing air would cut the diver's time underwater by an unacceptable amount and that routing high pressure air through a spear gun could quickly exhaust the entire tank if the spear gun blew a leak. This would be especially dangerous if it happened at a depth greater than 30 feet.

There is a need for a weapon that can kill lionfish quickly and humanely, without undue physical exertion on the part of the fisherman or sport diver. Such a weapon must allow the fisherman to bag the killed fish without risk of stings, while preserving the fish in a condition suitable for sale to a restaurant.

There is further a need for a lionfish weapon that is inexpensive to buy and operate; such a weapon also preferably is incapable of harming a person, whether it accidentally strikes a person or is mistakenly discharged toward a person.

There is further a need for a lionfish weapon that does not harm coral or other living creatures, whether by impact or by generation of chemical or other waste.

SUMMARY OF THE INVENTION

The present invention is a rapid-firing spear gun with a retained spear point and a firing mechanism powered by low-pressure gas, such as air from a SCUBA demand valve. The spear gun is adapted for efficient and safe use by a fisherman or sport diver for killing lionfish quickly, whether for kitchen use or merely to remove the lionfish from the environment.

The spear gun is generally a narrow cylinder that is connected to a low-pressure output from a SCUBA regulator port. When the trigger is actuated, a pulse of air drives a piston forward in a pressure tube. The piston in turn propels a spear forward a pre-determined distance, sufficient to project a spear tip out of the body far enough to kill a lionfish. The piston is stopped by two separate mechanisms: first, when compressed gas supply is shut off and pressure is released and, second, compression of a return spring.

Because the butt end of the spear is attached to a base plate that cannot leave the body of the spear gun, the spear is never flying freely and will not hit an unintended target if the lionfish is missed. Also, the spear does not need to be recovered and re-inserted into the spear gun. A self-cocking return spring pushes the piston back into "cocked," that is, a ready to shoot position as soon as pressure within the spear gun equilibrates with the environment by release of gas through an exhaust valve. The spear gun can shoot faster than once per second.

Yet another benefit of the piston and spear being retained in the body of the spear gun is that only a minute volume of compressed gas is used. If the spear were propelled away from the gun, air pressure would have to be maintained until the spear left the gun and some air bubble out the front of the spear gun. However, because air is used only to pressurize a small sealed chamber, relatively low pressure and only a few milliliters of air are required for a powerful shot. The time a diver can stay submerged is decreased by only a small percentage, even when many lionfish are rapidly killed. The diver monitors air use and quantity remaining with the standard gauge.

Removing a lionfish from a spear by hand is potentially dangerous and is usually done in a manner that protects the diver but sacrifices the condition of the fish's meat. The spear of the present invention self-retracts so rapidly that the spear loosens itself from the lionfish's body and can be removed by minimal additional force. In a preferred embodiment, a sliding spear cover is used to dislodge the fish if needed. The fish is removed without tearing or bruising the flesh and the fish may be placed in any convenient container that prevents accidental contact with spines. As mentioned, the butt of the spear is attached to the spear gun, but different tips may be installed, depending on the user's preference. For example, a three-pronged tip immobilizes a fish thoroughly, but a single prong tip causes less damage to the edible meat.

Obviously, many modifications and variations of the present invention are possible in light of the above teachings. It is therefore to be understood that within the scope of the appended claims the invention may be practiced otherwise than as specifically described.

The invention will now be described in more particular detail with respect to the accompanying drawings in which like reference numerals refer to like parts throughout.

BRIEF DESCRIPTION OF THE DRAWINGS

FIG. 4 is a side perspective view of an alternative embodiment of the front portion of the spear gun of the present invention in cocked position and with the nearer half of the body removed for clarity.

FIG. 5 is a side perspective view of an alternative embodiment of the front portion of the spear gun of the present invention in discharge position and with the nearer half of the body removed for clarity.

DETAILED DESCRIPTION OF THE INVENTION

Figure 1:
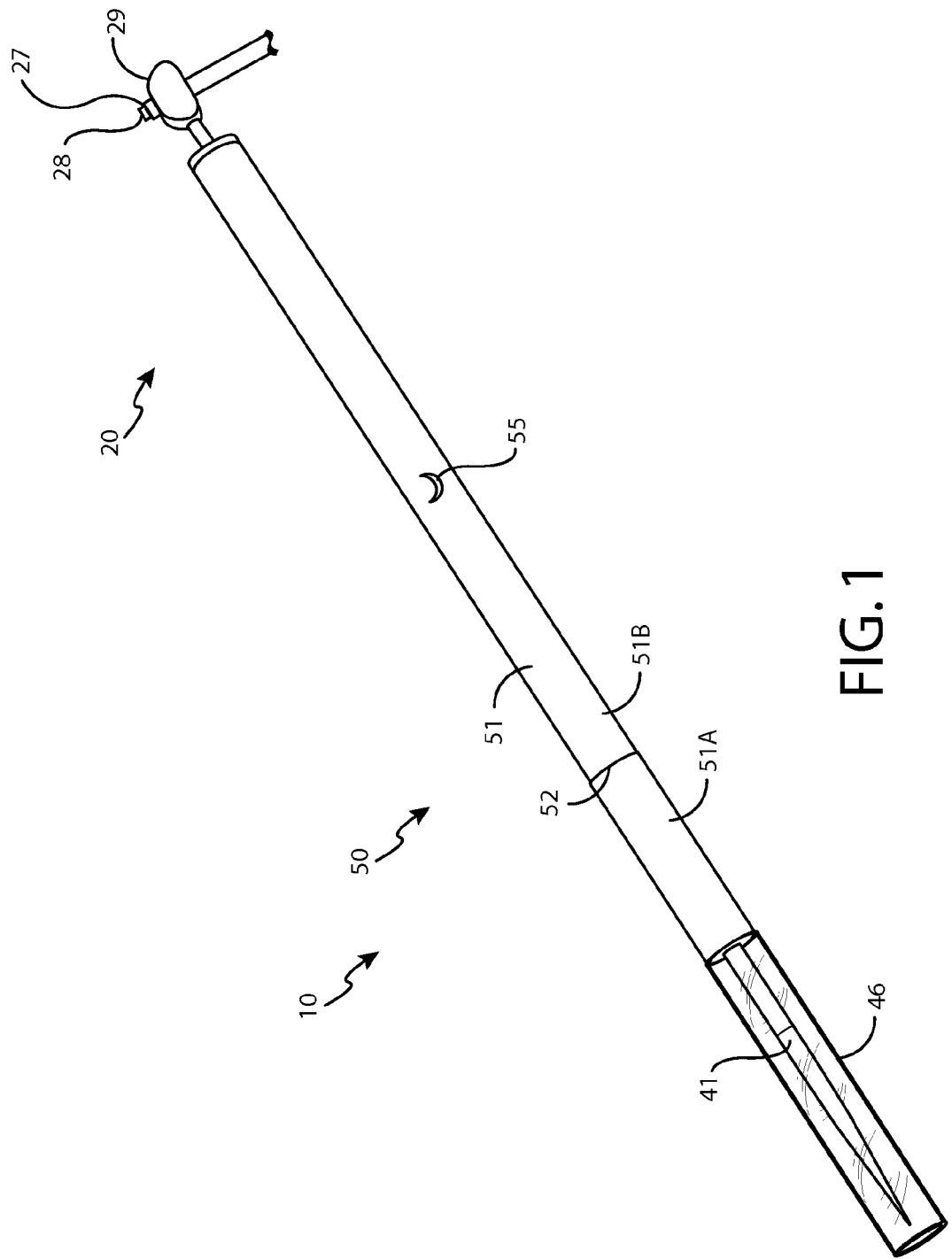
FIG. 1 is a side perspective view of the spear gun of the present invention.

The present invention is a spear gun 10 specially adapted for rapidly killing invasive lionfish with little risk to the user or other persons. FIG. 1 is a side perspective view of a preferred embodiment of spear gun 10. Spear gun 10 includes a body 50, which is optionally assembled from sections 51, connected such as by a threaded fitting 52, for ease in carrying and convenience in manufacture. The illustrated embodiment includes a front body section 51A and a rear body section 51B. Sections 51A,B are typically manufactured from suitable cylindrical tubing, such as aluminum, stainless steel, plastic, or other suitable materials, of appropriate thickness, with a typical diameter of 0.75 to 1.5 inches. The total length of body 50 is typically 24 to 36 inches long. Also seen in FIG. 1 is a spear 41 projecting from front body section 51A, spear 41 optionally covered by a sliding spear cover 46.

As described herein, spear gun 10 is considered to have a front or forward end, which is generally where spear 41 is located. Spear gun 10 is considered to have a rear or back end, which is generally opposite the front end. All locational references herein such as "forward," or "rearward," should be understood in terms of the front and rear of spear gun 10.

Spear gun 10 further includes a pneumatic system 20, which is only partially visible in FIG. 1, for receiving and directing compressed gas from a source, such as a SCUBA low-pressure port. It is common for a SCUBA set to include a secondary port, other than the diver's regulator, that supplies compressed breathing gas, such as air, at the appropriate pressure, up to 150 PSI. Pneumatic system 20 generally includes connection means such as a valve, such as three-way valve 29 that is disposed between the SCUBA low-pressure port and pressure tube 21, as is well known in the art. Pressure tube 21 includes an inlet end 22, which is connected to three-way valve 29. Three-way valve 29 opens and closes communication between SCUBA low-pressure port and pressure tube 21 and also includes a one-way exhaust valve 27 to release exhaust gas to equilibrate pressure after spear gun 10 is fired.

A trigger, such as push-button trigger 28, is depressed to allow flow of compressed gas into pressure tube 21. The pressurized gas activates a firing mechanism (described in detail below) to fire spear gun 10, as will be described below. After firing, three-way valve 29 closes communication with compressed gas source and opens communication between pressure tube 21 and exhaust valve 27. Pressurized gas in pressure tube 21 exits through exhaust valve 27 until the pressure inside of pressure tube 21 is equal to that of the surrounding atmosphere or water. The equalizing of pressure allows the firing mechanism to return spear gun 10 automatically to the cocked position, as will be described below.

Body tube 50 is dimensioned and balanced such that a user may hold spear gun 10 by gripping spear gun 10 near trigger 28 while also holding spear cover 46. Rear section 51B also includes optional attachment loop 55, an attachment point for accessories such as, for example, a shoulder sling (not shown) or a retractable leash (not shown).

Figure 2:
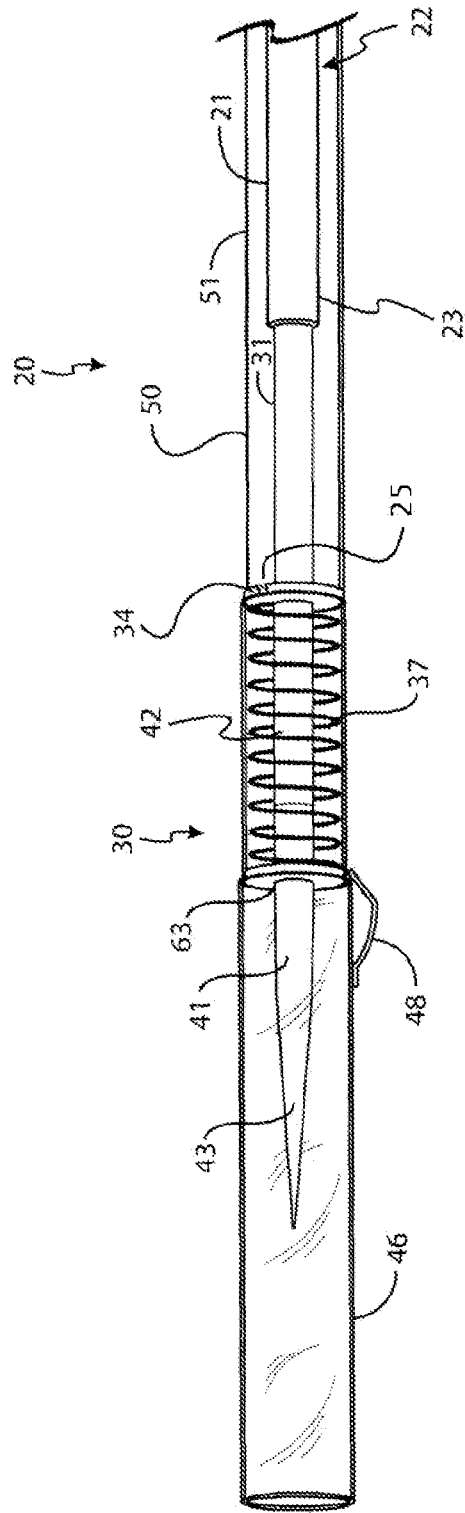
FIG. 2 is a side perspective view of the front portion of the spear gun of FIG. 1 in cocked position and with the nearer half of the body removed for clarity.
Figure 3:
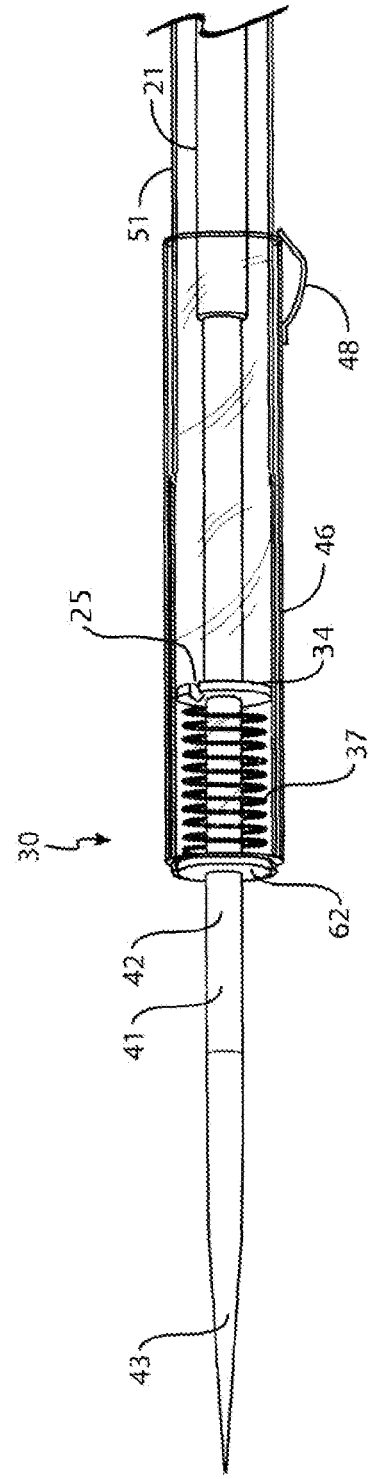
FIG. 3 is a side perspective view of the front portion of the spear gun of FIG. 1 in discharge position and with the nearer half of the body removed for clarity.

FIGS. 2 and 3 are side perspective views, with the closer half of body tube 50 removed, of the front portion of spear gun 10 of FIG. 1. As seen in FIGS. 2 and 3, spear 41 includes a tip section 43 and a connected section 42. Firing mechanism 30 comprises a piston 31, a base plate 34 attached to spear connected section 42; a front plate 62, including a spear aperture 63; and a return spring 37 attached in front of base plate 34. Firing mechanism 30 is for propelling spear 41 forward to a discharge position (FIG. 3), powerfully enough to impale prey the size of a lionfish, then automatically retracting spear 41 to a cocked position (FIG. 2).

Referring especially to FIG. 2, a different portion, compared to FIG. 1, of pneumatic system 20 is seen, namely front end 23 of pressure tube 21. Pressure tube 21 is typically ⅜ to ½ inch in diameter and strong enough to contain about 150 PSI gas. Suitable materials for pressure tube 21 include stainless steel and high-strength plastic such as acetal, nylon, carbon-reinforced epoxy, or UHMW-PE. Desirable qualities in the materials for pressure tube 21 are high burst strength, low friction, and low corrodibility in salt water. Pressure tube 21 should be large enough to provide a sufficient volume of compressed gas to drive spear 41 powerfully enough to kill a lionfish with one shot, but should not be excessively large so as to not waste breathing gas if a SCUBA tank is used as a gas source.

In cocked position, as seen in FIG. 2, piston 31 has an outer diameter very slightly less than the inner diameter of pressure tube 21 such that piston 31 may be inserted into front end 23 of pressure tube 21. Piston 31 can slide within pressure tube 21 but substantially blocks passage of compressed gas up to about 150 PSI. Thus, any increase in gas pressure in pressure tube 21 will push piston 31 frontward, that is, to the left. Grease or similar lubrication may be helpful for creating a gas-tight seal around piston 31. Appropriate materials are low-friction, relatively abrasion-resistant, and dimensionally stable, such as high-density polypropylene, aluminum, or stainless steel.

Also in FIG. 2, base plate 34 and front plate 62 are spaced well apart from each other, with a return spring 37 spanning between them and with connected section 42 disposed within the coils of spring 37.

Tip section 43 projects through spear aperture 63 and is covered by sliding tubular spear cover 46. Although spear tip 43 is pointed near the front end, the portion that is disposed between base plate 34 and front plate 62 in the cocked position has a uniform diameter that is can slide through spear aperture 63 while sealing spear aperture 63 against entry of water through spear aperture 63. Grease (not shown) or similar lubrication may be used if needed. Spear cover 46 includes a latch 48 for keeping spear cover 46 attached to front body section 51A and covering tip section 43, even when spear gun 10 is being transported. Spear cover 46 may be made of moderately strong plastic that is preferably abrasion resistant and tough.

Latch 48 is shown as being of a resilient material such as thin stainless steel or resilient plastic, attached at one end such as by adhesive to spear cover 46 and with a free end removably connected to front body section 51A such as by engaging an indented surface feature of 51A (not shown) or by friction. Depressing the raised central portion of latch 48 causes the free end to be displaced away from front section 51A. Other sorts of latch as are well known may be used, so long as they do not interfere with the ability of sliding spear cover 46 to slide.

Now looking more especially at FIG. 3, firing mechanism 30 is in the discharge position. First, latch 48 was released and spear cover 46 was pulled backward by sliding it over front body section 51A. Compressed air was released into pressure tube 21 by depression of trigger 28. Piston 31 accordingly moved frontward, pushing upon the back of base plate 34 to push base plate 34 closer to front plate 62, which both pushed spear tip 43 rapidly outward from front plate 62 and compressed return spring 37.

Base plate 34 does not create a gas-tight seal within body 50. Base plate 34 includes a gas relief port, such as slot 25, so that movement of base plate 34 in either direction does not affect gas pressure in any portion of spear gun 10.

After spear gun 10 has been discharged, the orientation of three-way valve 29 changes, such as by a second momentary depression of trigger 28 or by prolonged depression of trigger 28, depending upon the specific design of three-way valve 29 used. The flow of compressed air is shut off and exhaust valve 27 opens to allow air to escape until the air pressure in pressure tube 21 equals the ambient pressure of atmosphere or water. Without resistance from pressurized air, return spring 37 expands and pushes base plate 34 and piston 31 to their cocked positions. As spear 41 retracts, user optionally slides spear cover 46 forward to aid in removal of prey.

It has been found in testing that spear 41 retracts quickly and suddenly enough that spear tip 43 is loosened in any prey that was impaled during discharge. The force needed to manually slide spear cover 46 back to its covering position is more than sufficient to remove the prey. If prey was killed for food, it may be deposited in a game container as it is pushed off spear 41 with spear cover 46. If lionfish are being killed in quantity simply to remove them from the ecosystem, the bodies may be deposited on the ocean floor to be eaten by scavengers.

Anyone having some skill in the art will understand from FIGS. 2 and 3 that the compressibility of return spring 37 and the length of travel of piston 31 are interrelated. Piston 31 must travel enough to compress return spring 37 such that return spring 37 will expand forcefully once gas pressure has equalized. Although return spring 31 must create enough force to pull spear 41 back quickly, it must allow piston 31 to travel far enough to give spear 41 a thrust that is appropriate for impaling a lionfish. Return springs are often fairly trivial components of a mechanism, but in this case, return spring 37 is unusually critical to the function of spear gun 10.

FIGS. 4 and 5 illustrate an alternative embodiment 10A of the spear gun of the present invention. Spear gun 10A differs from the previously-described embodiment 10 in three ways: 1) exhaust gas exits spear gun 10A from the front portion of body 50, so compressed gas must flow forward through spear gun 10A, 2) piston means 31 is a slender rod with a flange means 32, such as a flange 32B with larger diameter than piston means 31, attached to the rear end, and 2) spear cover 46A is removable but does not slide.

FIGS. 4 and 5 are side perspective views, with the closer half of body tube removed, of an alternative embodiment of the front portion of a spear gun 10A. Trigger 28 is not shown, but consists of any device to allow and stop flow of gas from the compressed gas source to pressure tube 21, as described in the explanation of FIG. 1. Pressure tube 21 includes at least one gas relief port 24, such as the two small apertures pictured. As long as flange 32B is rearward of gas relief ports 24, gas cannot escape pressure tube 21 and its pressure is used only to push flange 32B frontward.

Piston stop 33 comprises a ring, that is, a plate with an aperture 65, fixed in the desired position within body 50. Aperture 65 allows passage of the slender rod of piston means 31 but is too small to allow passage of flange 32B.

Upon activation of trigger 28, compressed gas pushes flange 32B frontward, as described above and depicted in FIG. 5. In FIG. 5, flange 32B has come to rest behind piston stop plate 33 after having moved past gas relief ports 24. Compressed gas is now able to move out of pressure tube 21 and through body sections 51A, B. As soon as compressed gas starts escaping pressure tube 21, the pressure driving piston 31 is greatly reduced. Piston stop 33 provides a positive end to the travel of piston 21. Alternatively, piston stop 33 may be omitted. In this case, the combination of falling gas pressure and increasing resistance from spring 37 would also serve to limit the travel of piston 31 to a desired length.

Exhaust gas moves forward by flowing through vents 35 through both base plate 34 and piston stop 33 (best seen in FIG. 5) and is discharged through one-way valves 27, such as the duckbill valves shown.

Alternative spear cover 46A is removably attached to front body section 51A such as by a friction fit. It is sized such that spear 41 is fully enclosed when in the cocked position (FIG. 4) but projects outward from cover 46A in the discharged position (FIG. 5), sufficiently to impale a lionfish. Because lionfish are not especially frightened of humans, it is possible to approach them quite closely and place a shot precisely.

Spear 41 is shown as consisting of two sections 42 and 43, connected together such as by a threaded joint. Spear tip section 43 is illustrated herein as a single sharp prong, which is desirable for killing game fish. However, other spear tip configurations may be desirable, such as a three-prong "paralyzer" tip. The user may switch spear tips 43 if desired by unscrewing one tip 43 and replacing it with a different style of tip 43.

In the case of spear gun 10A, with a spear cover 46A that does not fully cover spear 41 during accidental discharge, a user would remove spear tip 43 for transport, leaving spear cover 46A to protect spear connected section 42. For additional safety, the compressed gas source is kept closed by conventional means, such as a tank main valve, until ready to spear fish. Upon reaching the location for spearing fish, the user removes spear cover 46A, installs the desired spear tip 43, replaces spear cover 46A, and opens the main valve of the compressed gas source. At this time, accidental discharge of spear gun 10A could potentially injure a person, but it is believed most spear gun accidents actually occur during transport above water and moving to and from the fishing location, especially during ascent.

As discussed above, spear 41 loosens itself from impaled prey upon retraction from the discharged to the cocked position so that only a slight additional force can dislodge a fish from spear 41. For spear gun 10A, retraction of spear 41 into spear cover 46A provides the force needed to push the fish off the spear tip 43. In either embodiment 10 or 10A, spear cover 46 or 46A may optionally be provided with a hand protector (not shown), such as a bell guard, such as composed of resilient rubber, to protect the hand from contact with spines.

These embodiments, spear gun 10 and 10A have been described as though they are completely alternative entities. Actually, features may be mixed to create other alternative embodiments not pictures or described. For example, different valve types and layouts are envisioned that would also provide the functions described and claims. Non-sliding spear cover 46A may be combined with the rear-exhausting pneumatic system of spear gun 10, for example.

Both spear guns 10, 10A have been described as composed of two body sections, 51A and 51B, threaded together. It is not essential that body 50 be divided into sections, but in the embodiment 10A, the presence of threaded fittings 52 (seen in FIGS. 4 and 5) makes the installation of piston stop 33 much easier and less expensive. A piston stop plate 33 could be inserted into a single body tube 50 and fixed in place, such as by brazing. A preferred method of construction is to locate a threaded fitting 52 at the desired location of piston stop 33. Piston stop 33 is inserted into the mouth of one of body sections 51A or 51B. It may be fixed in place simply by a friction fit, as it is not difficult to press or pound piston stop 33 into position flush with the mouth of body section 51 A, B. Piston stop plate 33 may alternatively be brazed into position, which is also much easier than placing and brazing it inside a long body tube 50.

Another possible alternative is to encase only the front section of spear gun 10 in a body 50. This alternative is best understood by looking at FIG. 5. The section between front plate 62 and piston stop 33 is the only section of spear gun 10A that truly needs to be contained in body 50, to maintain front plate 62 and piston stop 33 parallel and at a fixed distance apart, to provide a guide for movement of base plate 34, and to constrain return spring 37 from possibly buckling sideways. If rear body section 51B is removed from spear gun 10A, the remaining section 51A together with front plate 62 and piston stop 33, may be seen to define a spring chamber 60 that houses the moving components of firing mechanism 30 when in discharge position. Body section 51A forms the tubular wall 61 of spring chamber 60 and piston stop 33 forms the rear plate of spring chamber 30. The spear gun of this embodiment functions identically to spear gun 10A except that pressure tube 21 is exposed. Pressure tube 21 is accordingly made robust enough that a user can grip pressure tube 21 directly, or a rigid spiderweb-like covering can be provided, or trigger 28 may be moved forward so that the alternative spear gun may be gripped mainly on spear cover 46 and tubular wall 61.

Return spring 37 has been described and illustrated as a conventional, if painstakingly-designed, coiled spring. However, other return springs are envisioned. Return spring 37 may be a single coil or two coils stacked together. Return spring 37 may alternatively be any structure that stores and releases compression forces received from piston 31, for example, a block of very resilient rubber disposed between base plate 34 and spear 41, or a thick cylinder of rubber with an inner chamber for receiving spear butt 42. Return spring 37 may alternatively be a tension member placed behind base plate 34, such as between base plate 34 and piston stop 33 of spear gun 10A.

Although particular embodiments of the invention has been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

What is claimed is:

1. A spear gun having a front end for a spear and a rear end connected to a source of compressed gas; comprising:
    a pneumatic system; including:
        a pressure tube connected to a source of compressed gas;
        a valve for starting and stopping flow of compressed gas disposed between said pressure tube and the source of compressed gas;
        a trigger for activating said valve; and
        at least one exhaust port for releasing compressed gas to equilibrate pressure between the environment and said pressure tube;
    a piston having a cocked position and a discharge position; said piston including
        a front end; and
        a back end disposed within said pressure tube and slidably sealing said pressure tube;
    a spring chamber; including:
        a hollow tubular body housing having a front end and a rear end;
        a front plate covering said front end of said tubular body; including:
            a spear aperture; and
        stop means for limiting travel of said piston; and
        a return spring spanning between said front plate and a base plate;
    a spear assembly; including:
        a spear for impaling prey; including:
            a spear shaft including:
                a spear tip at a front end; and
                a rear connected section; wherein said base plate is attached to said connected section rearward of said return spring and slidable within said spring chamber; said spear having a rearward cocked position and a forward discharge position; and wherein said spear is moved from the cocked position to the discharge position by the action of said front end of said piston being pushed forward by compressed gas in said pressure tube, pushing against said base plate and thereby pushing said attached spear forward through said spear aperture, and such that said base plate compresses said spring; and wherein:

after release of gas pressure from said pressure tube through said exhaust valve, said spear is returned to cocked position by recoil of said return spring pushing said base plate and piston rearward to said piston's cocked position.

2. The spear gun of claim 1, said pressure tube and said spring chamber being fluidly connected such that gas pressure from said pressure tube is vented into said spring chamber when said piston reaches its discharge position.

3. The spear gun of claim 2, said pressure tube including:
a relief port disposed such that said piston back end is forward of said relief port when said piston is in discharge position and behind said relief port when said piston is in cocked position; said relief port in fluid communication with said spring chamber.

4. The spear gun of claim 1, further including:
a spear cover removably attached to cover said spear tip and said front plate, for both covering said spear tip for safety and to aid in dislodging impaled prey.

5. The spear gun of claim 1, wherein said stop means comprises:
said spear aperture having a diameter less than that of said base plate so as to stop forward movement of said base plate such that said spear cannot be propelled completely through said spear aperture.

6. The spear gun of claim 1 wherein said stop means comprises:
said return spring exerting a force on said base plate substantially equal to the opposing force exerted by said piston.

7. The spear gun of claim 1, said spear aperture having an inner diameter substantially equal to the outer diameter of said spear butt section such that said spear butt can slide within said spear aperture while substantially sealing it against water.

\* \* \* \* \*